(12) United States Patent
Wang et al.

(10) Patent No.: US 8,711,803 B1
(45) Date of Patent: Apr. 29, 2014

(54) FAST BASE STATION SWITCHING METHOD AND SYSTEM, AND HIERARCHICAL ZONE-BASED FAST HANDOFF APPROACH

(75) Inventors: Guo Qiang Wang, Kanata (CA); Brian Vezza, Allen, TX (US)

(73) Assignee: Apple Inc., Cupertino, CA (US)

( * ) Notice: Subject to any disclaimer, the term of this patent is extended or adjusted under 35 U.S.C. 154(b) by 2486 days.

(21) Appl. No.: 11/357,200

(22) Filed: Feb. 21, 2006

(51) Int. Cl.
*H04W 4/00* (2009.01)

(52) U.S. Cl.
USPC ........... 370/331; 370/206; 370/310; 370/328; 370/329; 709/206

(58) Field of Classification Search
USPC ........... 370/310, 331, 328, 329, 206; 709/206
See application file for complete search history.

(56) References Cited

U.S. PATENT DOCUMENTS

| | | | |
|---|---|---|---|
| 2001/0003096 A1* | 6/2001 | Lee | 455/562 |
| 2002/0065079 A1* | 5/2002 | Ekman et al. | 455/436 |
| 2002/0105922 A1* | 8/2002 | Jabbari et al. | 370/328 |
| 2003/0026250 A1* | 2/2003 | Fang | 370/386 |
| 2005/0054312 A1* | 3/2005 | Spirito et al. | 455/226.1 |
| 2006/0056365 A1* | 3/2006 | Das et al. | 370/338 |
| 2006/0193280 A1* | 8/2006 | Lee et al. | 370/315 |
| 2007/0097945 A1* | 5/2007 | Wang et al. | 370/349 |

OTHER PUBLICATIONS

IEEE Xplore—Fast Handover Scheme for Real-Time Downlink Services in IEEE 802.16e BWA System, 2005, to Choi et al.*
Mobile IP Network Working Group RFC4068, Jul. 2005, to R. Koodli.*

* cited by examiner

*Primary Examiner* — Ayaz Sheikh
*Assistant Examiner* — Hai-Chang Hsiung
(74) *Attorney, Agent, or Firm* — Meyertons, Hood, Kivlin, Kowert & Goetzel, P.C.

(57) ABSTRACT

A method of performing fast base station switching for hand off is provided that involves the use of a tunnel from a serving base station to a target base station. During a hand off, packets are forwarded by the serving base station to the target base station using the tunnel. A hierarchical hand off method is also provided that uses a diversity hand off method for a hand off between base stations of different zones, and uses a non-diversity handoff, such as the fast base station switching method, for a hand off between base stations in the same zone.

16 Claims, 6 Drawing Sheets

FAST BASE STATION SWITCHING METHOD AND SYSTEM, AND HIERARCHICAL ZONE-BASED FAST HANDOFF APPROACH

FIELD OF THE INVENTION

The invention relates to handoff in wireless networks.

BACKGROUND OF THE INVENTION

The latest Broadband wireless data network technology development, including WiFi (802.11), WiMAX (802.16e) and DSRC (802.11p) technology, is progressing to large scale and full mobility. To support full mobility, various handoff (HO) procedures have been defined. Primarily, three handoff technologies are being developed:
1) Soft handoff (SOHO): SOHO is a make-before-break approach. In SOHO, an ASN (Access Service Network) anchor point device multicasts the same data flows to both a serving base station (base station) and all potential target base station. The mobile station (mobile station) has a selector to decide which target base station it is going to talk to when it moves from the serving base station to the next base station. An advantage of SOHO is that there will be no data packet loss during handoff because the same packets have been sent to the new target base station before the mobile station attaches to that new base station. A disadvantage for SOHO is that additional system resources (buffers, CPU, bandwidth, and air spectrum) are required to support the multicast data flows.
2) Hard handoff (HDHO): HDHO is a break-before-make approach. In this case, a mobile station just simply drops a connection with the current serving base station, and re-establishes a new connection with a new target base station. During handoff, all the packets that were previously sent to the serving base station are lost, and the service flow has to be re-created using higher layer protocols. For example, where TCP is employed, the TCP layer would drop the original session and rebuild a new session. An advantage of HDHO is that it is simple and does not cost much in terms of system resources. A disadvantage is that the data path interruption may last up to 100+ ms to seconds. This leads to packet loss that can dramatically impact application performance.
3) Fast Base Station Selection: With this approach, fast selection between a serving base station and a target base station is performed to support handoff and reduce the packet loss. The faster the selection speed is, the less packet loss is suffered, and the closer the performance is to that of SOHO. The slower the switching performed with fast base station selection, the closer the performance is to that of HDHO. Fast base station selection is also referred to in section 3.7.6 of a 802.16-2005 document as follows:
   The mobile station (mobile station) is only transmitting/receiving data to/from one of active base station (anchor base station) at any give time. The anchor base station can change from frame to frame depending on the base station (base station) selection schema.

SUMMARY OF THE INVENTION

According to one broad aspect, the invention provides a method of performing fast base station switching of a mobile station's communications from a first base station to a second base station comprising: a first base station acting as a serving base station receiving packets from a data source destined for the mobile station; the first base station transmitting packets to the mobile station; to implement the fast base station switch to the second base station, the first base station forwarding to the second base station all packets that have not been transmitted to the mobile station or that have not been acknowledged by the mobile station; the second base station receiving the packets from the first base station; the second base station transmitting packets received from the first base station to the mobile station; later, the second base station receiving packets from the data source destined for the mobile station such that the second base station acts as a serving base station.

In some embodiments, the method further comprises: establishing a tunnel between the first base station and the second base station for forwarding packets between the first base station and the second base station.

In some embodiments, the method further comprises: for a handoff zone comprising a plurality of base stations and a data source, establishing a plurality of tunnels between pairs of the base stations such that the switch from a first base station to a second base station can be performed for any of the pairs of base stations.

In some embodiments, the method further comprises: at the first base station: a) during non-handoff operation, receiving the packets on an ingress port and queuing them in an ingress queue; b) during non-handoff operation, de-queuing packets from the ingress queue and transmitting them over an air interface; c) during handoff, de-queuing packets from the queue and re-queuing them in an egress queue; d) during handoff, de-queuing packets from the egress queue and sending them to the second base station on an egress handoff port; at the second base station: d) during handoff, receiving the packets on an ingress handoff port and queuing them in an ingress queue; f) during handoff, de-queuing packets from the ingress queue and transmitting them over an air interface.

According to another broad aspect, the invention provides a method comprising: defining a plurality of non-diversity handoff zones, each non-diversity handoff zone comprising a respective plurality of non-diversity-enabled base stations; to perform a handoff between a first base station and a second base station of said base stations: performing a non-diversity handoff to complete the handoff if the first base station and the second base station are in the same non-diversity handoff zone; performing a diversity handoff to complete the handoff if the first base station and the second base station are in different non-diversity handoff zones.

In some embodiments, performing a non-diversity handoff comprises performing fast base station selection.

In some embodiments, performing a non-diversity handoff comprises performing fast base station switching.

In some embodiments, performing fast base station switching comprises: a first base station acting as a serving base station receiving packets from a data source destined for the mobile station; the first base station transmitting packets to the mobile station; to implement the fast base station switch to the second base station, the first base station forwarding to the second base station all packets that have not been transmitted to the mobile station or that have not been acknowledged by the mobile station; the second base station receiving the packets from the first base station; the second base station transmitting packets received from the first base station to the mobile station; later, the second base station receiving packets from the data source destined for the mobile station such that the second base station acts as a serving base station.

In some embodiments, the method further comprises: establishing a tunnel between the first base station and the second base station for forwarding packets between the first base station and the second base station.

In some embodiments, the method further comprises: at the first base station: a) during non-handoff operation, receiving the packets on an ingress port and queuing them in an ingress queue; b) during non-handoff operation, de-queuing packets from the ingress queue and transmitting them over an air interface; c) during handoff, de-queuing packets from the queue and re-queuing them in an egress queue; d) during handoff, de-queuing packets from the egress queue and sending them to the second base station on an egress handoff port; at the second base station: d) during handoff, receiving the packets on an ingress handoff port and queuing them in an ingress queue; f) during handoff, de-queuing packets from the ingress queue and transmitting them over an air interface.

In some embodiments, the method further comprises: defining a plurality of virtual base stations each comprising a relay and a base station served by the relay; wherein for the purpose of non-diversity handoff zones, each virtual base station is treated as a non-diversity-enabled base station.

In some embodiments, the method further comprises: providing service to at least one mobile station with a mobile relay, the mobile relay and served mobile station comprising a mobile relay and mobile station pair; to perform a handoff of a mobile relay and mobile station pair between a first base station and a second base station of said base stations: performing a non-diversity handoff to complete the handoff if the first base station and the second base station are in the same non-diversity handoff zone; performing a diversity handoff to complete the handoff if the first base station and the second base station are in different non-diversity handoff zones.

According to another broad aspect, the invention provides a system comprising: a plurality of base stations organized into non-diversity handoff zones; an inter-zone handoff controller; the system being adapted to perform handoffs between a first of the base stations and a second of the base stations by: performing a non-diversity handoff to complete the handoff if the first base station and the second base station are in the same non-diversity handoff zone; performing a diversity handoff under control of the inter-zone handoff controller to complete the handoff if the first base station and the second base station are in different non-diversity handoff zones.

In some embodiments, the system is adapted to perform a non-diversity handoff by performing fast base station selection.

In some embodiments, the system is adapted to perform a non-diversity handoff by performing fast base station switching.

In some embodiments, the system is adapted to perform fast base station switching by: a first base station acting as a serving base station receiving packets from a data source destined for the mobile station; the first base station transmitting packets to the mobile station; to implement the fast base station switch to the second base station, the first base station forwarding to the second base station all packets that have not been transmitted to the mobile station or that have not been acknowledged by the mobile station; the second base station receiving the packets from the first base station; the second base station transmitting packets received from the first base station to the mobile station; later, the second base station receiving packets from the data source destined for the mobile station such that the second base station acts as a serving base station.

In some embodiments, the system further comprises a network hierarchical handoff control architecture comprising said master handoff controller at inter-zone level, zone-handoff-controllers at intra-zone level and handoff-agents at each base station.

In some embodiments, the system is adapted to establishing a tunnel between the first base station and the second base station for forwarding packets between the first base station and the second base station.

In some embodiments, the first base station is adapted to: a) during non-handoff operation, receiving the packets on an ingress port and queuing them in an ingress queue; b) during non-handoff operation, de-queuing packets from the ingress queue and transmitting them over an air interface; c) during handoff, de-queuing packets from the ingress queue and re-queuing them in an egress queue; d) during handoff, de-queuing packets from the egress queue and sending them to the second base station on an egress handoff port; the second base station is adapted to: d) during handoff, receiving the packets on an ingress handoff port and queuing them in an ingress queue; f) during handoff, de-queuing packets from the ingress queue and transmitting them over an air interface.

According to another broad aspect, the invention provides a base station comprising: at least one input port for receiving packets destined for mobile stations; an output port for outputting packets on a tunnel towards another base station; physical layer hardware; a packet dispatcher adapted to transmit received packets for a given mobile station to the given mobile station via the physical layer hardware while the given mobile station is attached to the base station, and to send the packets towards the output port during a fast base station switch handoff to the another base station.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

Figure 1:
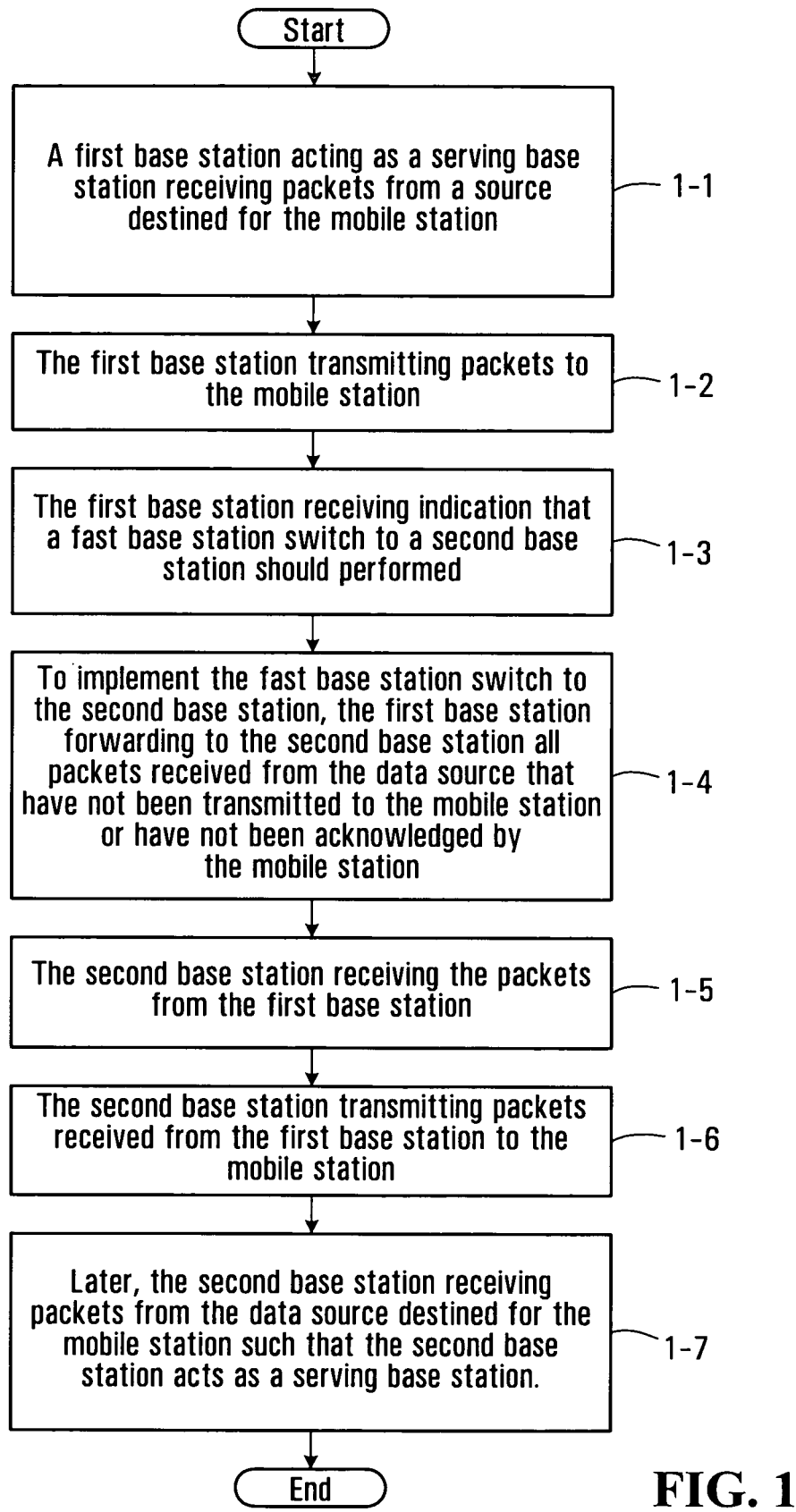
FIG. 1 is a flowchart of a method of performing fast base station switching in accordance with an embodiment of the invention.

An embodiment of the invention provides a method of performing fast base station switching. Referring to FIG. 1, the method involves performing the following steps:

Step 1-1: a first base station acting as a serving base station receives packets from a data source destined for the mobile station. In some implementations, the packets may be segmented and re-assembled;

Step 1-2: the first base station transmits queued packets to the mobile station;

Step 1-3: the first base station receives an indication (that might be triggered from the data source or from the mobile station for example), or otherwise making a determination that a fast base station switch to a second base station should be performed;

Step 1-4: to implement the fast base station switch to the second base station, the first base station forwards to the second base station all packets received from the data source that have not been transmitted to the mobile station, or that have been transmitted but not acknowledged by the mobile station; for example, this might involve transferring both the packets that have not been acknowledged, and packets that have not yet been transmitted from an ingress queue (e.g., via an ARQ (automatic repeat request) dispatcher) to an egress queue for transmission on a handoff tunnel;

Step 1-5: the second base station receives the packets from the first base station and queuing them for transmission to the mobile station;

Step 1-6: the second base station transmits packets received from the first base station to the mobile station;

Step 1-7: later, the mobile station notifies the data source of the successful handoff operation, and the data source stops sending packets to the first base station, and redirects the packets to the second base station. The second base station then receives packets from the data source destined for the mobile station such that the second base station acts as a serving base station.

In the above-described method, the data source can be an anchor point for communication with the base stations and possibly other base stations. In some embodiments, context information is forwarded from the first base station to the second base station before starting to forward packets between the two base stations.

In some embodiments, the method further involves establishing a tunnel from the first base station to the second base station to carry the forwarded traffic. In some embodiments this tunnel is pre-configured such that any handoff from the first base station to the second base station is executed using the pre-configured tunnel. In other embodiments, the tunnel is configured on demand, for example using the MPLS (multi protocol label switching) RSVP protocol. The tunnels can be implemented using any suitable technology, typically dependant on the technology of the zone gateways. Specific examples include IP-in-IP, Mac-in-Mac, MPLS label stack, resilient packet ring (RPR), and optical channels.

In some embodiments, the first part of the method described, namely the forwarding of packets from the first base station to the second base station via fast base station switching, is implemented without any involvement of network-dependent data plane forwarding intelligence, other than possibly as an element in the path of elements participating in the forwarding of packets. The control plane for handoff operation (e.g., target base station selection, data path redirection, etc.) may still involve collaboration between the base stations and the data source.

The method is referred to herein as fast base station switching because packets are forwarded (i.e. effectively "switched") to a selected base station without the network performing a switch between base stations, at least not until the end of the method when the packet flow is re-directed.

Figure 2:
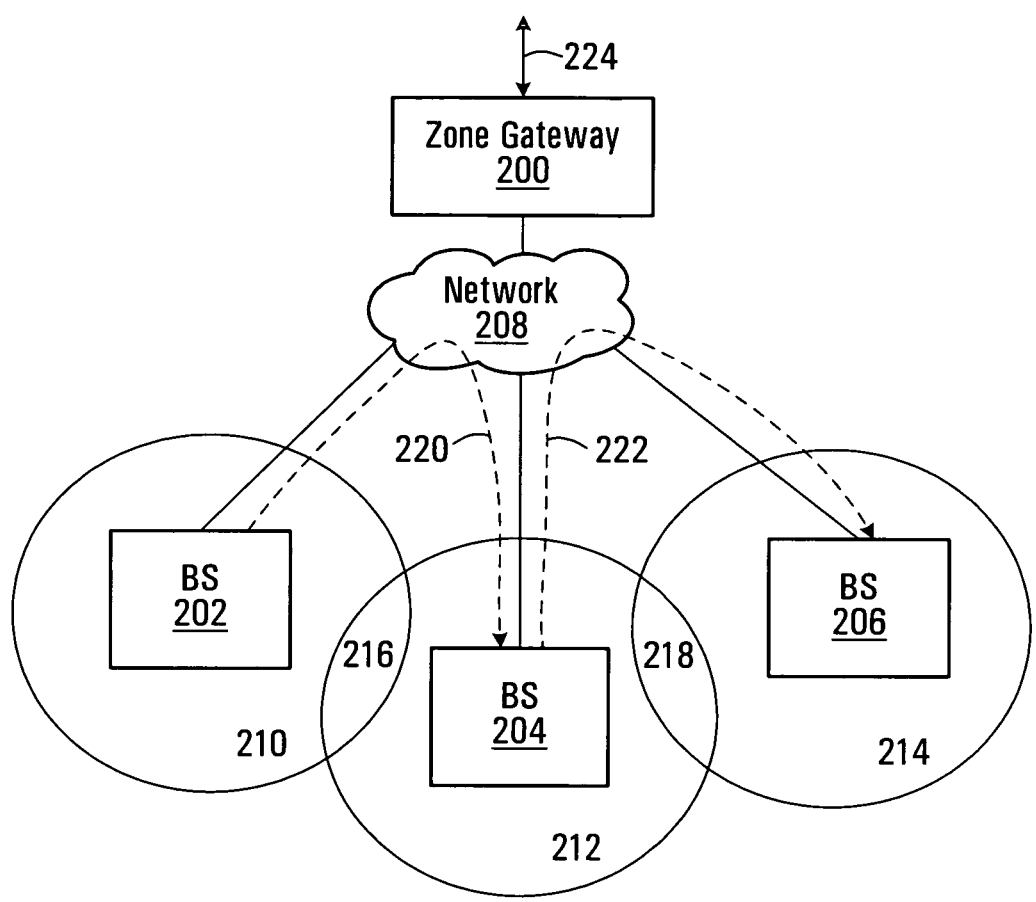
FIG. 2 is a block diagram of a network adapted to perform fast base station switching in accordance with an embodiment of the invention.

Referring now to FIG. 2, shown is a block diagram of a network that can be used to implement the fast base station switching method described above. The network consists of a plurality of base stations 202,204,206 (only three shown, but more generally any number can be included) connected through a network 208 to a zone gateway 200. The base stations 202,204,206 have coverage areas 210,212,214 respectively. An overlap between coverage areas 210 and 212 is indicated at 216 and an overlap between coverage areas 212 and 214 is indicated at 218. The zone gateway 200 sends and receives traffic as indicated at 224 on behalf of the base stations within the zone, namely base stations 202,204,206, and more specifically on behalf of mobile stations within the coverage areas served by these base stations.

An example of fast base station switching will now be described in the context of the network of FIG. 2. Initially, assume there is a mobile station within coverage area 210 being served by base station 202. In this case, traffic is being forwarded bi-directionally between the zone gateway 200 and the base station 202 on behalf of the mobile station. When the mobile station moves within the overlap 216 between the coverage areas 210,212 of base stations 202,204, eventually a decision is made to start serving the mobile station from base station 204 rather than base station 202. To achieve this, once this decision is made, base station 202 forwards the mobile station's traffic consisting of traffic that it has received for the mobile station but not yet transmitted (or not yet acknowledged) to the mobile station, and any further traffic that it receives for the mobile station, on a tunnel 220 established through network 208 between base station 202 and base station 204. A similar tunnel is indicated at 222 to enable forwarding of traffic from base station 204 to base station 206. Tunnels 220,222 can either be pre-configured, or set up upon demand. The base station 204 receives the traffic for the mobile station over the tunnel 220 and then transmits it over the air interface to the mobile station within coverage area 212. At some later time, for example after traffic has stabilized and the mobile station is no longer in the overlap area 216, the zone gateway 200 will be signalled to forward packets directly to base station 204 for the mobile station.

A specific implementation suitable for use in an ARQ-enabled WiMAX network will now be described with reference to FIG. 3. When mobility of a mobile station occurs, a mobile station sends/receives handoff-request and/or handoff-confirm to/from serving base station. These messages may trigger FBSS handoff tunnel creation between serving base station and the chosen target base station (if it is not created before.)

Figure 3:
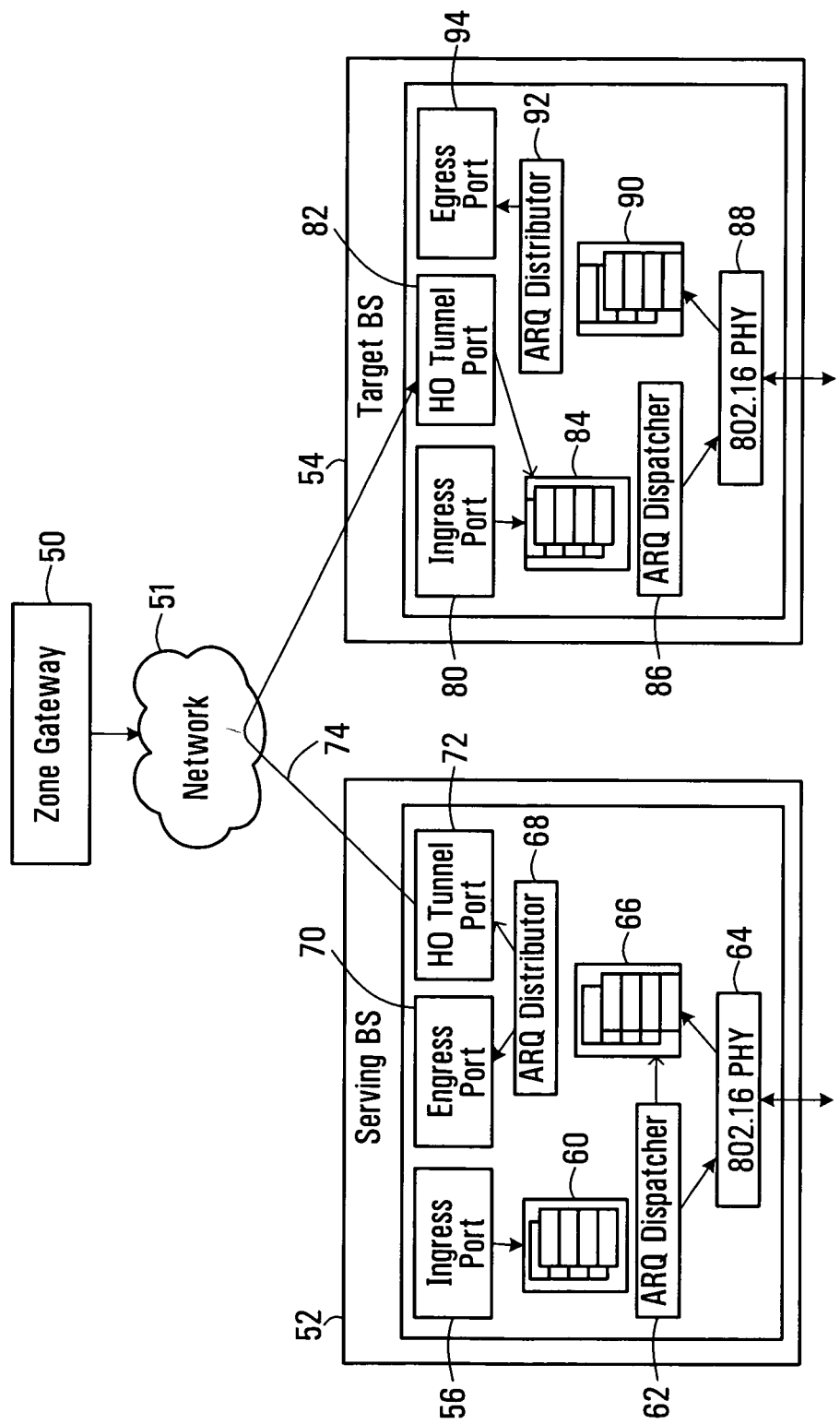
FIG. 3 is a detailed schematic diagram of a pair of base stations performing a fast base station switching.

Referring now to FIG. 3, shown is a specific implementation of the fast base station switching approach described above with reference to FIG. 2. Shown in the detailed example is a zone gateway 50 and two base stations 52,54. There may be a network 51 between the zone gateway 50 and the base stations 52,54. At the instant depicted, base station 52 is a serving base station while base station 54 is a target base station. The serving base station 52 receives packets for a mobile station (not shown) through ingress port 56 from where they are queued into a queue 60. An ARQ dispatcher 62 takes care of downlink packet transmission to the physical layer, in the illustrated example this being an 802.16 OFDM PHY layer. The ARQ dispatcher 62 de-queues packets from the queue 60. Assuming that the mobile station is still within the coverage area of the serving base station 52 and that no handoff is to be executed, the packets are then forwarded on to the physical layer 64 for transmission over the air interface. In the illustrated example, the physical layer is an 802.16 physical layer, but more generally any appropriate physical layer technology can be employed. On the other hand, if the mobile station has moved so as to be within the coverage area of the target base station 54, and it indicates the desire to attach to target base station 54, then packets are to be forwarded to the target base station 54 on behalf of the mobile station. To achieve this, the ARQ dispatcher 62 switches over the packets to an egress queue 66. Furthermore, packets that come from a mobile station via the physical layer 64 are also queued in the egress queue 66.

The manner in which queuing is performed is implementation specific. There may be separate egress queues for downlink traffic that is being re-routed to a target base station and for uplink traffic originated from a mobile station. In some embodiments, there is separate queue or queues for each mobile station being served by the base station.

There is an ARQ distributor 68 that de-queues packets from the egress queue 66. In the specific example illustrated, the ARQ distributor receives 802.16 MAC PDUs from the OFDM PHY and delivers them to the uplink or handoff tunnel. Packets that originated from the ARQ dispatcher are forwarded on to handoff tunnel port 72, while packets that originated from the physical layer 64 are forwarded on to egress port 70. Packets from egress port 70 are then forwarded in an uplink direction through the network to their destination. On the other hand, packets forwarded by the handoff tunnel port 72 are transmitted over a tunnel 74 to the target base station 54. Tunnel 74 can either be established on demand when it becomes necessary to perform the handoff, or the tunnel can be pre-configured between the serving base station 52 and the target base station 54. In the illustrated example, the tunnel 74 is shown passing through network 51 and not the zone gateway 50. In some instances, the tunnel 74 may be established through the zone gateway 50.

In some implementations, to implement the packet forwarding, the serving base station control plane commands the ARQ dispatcher to loop-back sequenced MAC PDU from an ingress ARQ-enabled buffer to an egress ARQ-enabled buffer. The original outgoing packets now become incoming packets to be tunnelled to target base station.

The target base station 54 receives downlink packets from the zone gateway 50 at ingress port 80 and they are queued in ingress queue 84. Furthermore, during a handoff the target base station also receives packets via the tunnel 74 at the handoff tunnel port 82 and they are also queued in ingress queue 84. Again, the manner in which queuing is performed is implementation specific. There may be separate ingress queues for non-handoff traffic that is being received from the zone gateway and for traffic re-routed from another base station. In some embodiments there is a separate queue or queues for each mobile station. The ARQ dispatcher 86 de-queues packets from the ingress queue 84 and transmits them over the physical layer 88. Furthermore, uplink packets received over the air interface by the physical layer 88 are queued in egress queue 90. They are de-queued by the ARQ distributor 92 and transmitted over egress port 94.

In some embodiments, where each packet is segmented into many blocks with associated sequence numbers (the sequence number is used for reliable transmission/re-transmission in which each receipt of each block has to be acknowledged), the ARQ distributor at serving base station 52 co-ordinates the unacknowledged sequence numbers of outgoing MAC PDUs with the ARQ dispatcher at the target base station 54 from the received MAC PDU. The unacknowledged MAC PDU will be re-transmitted at the target base station 54 after the mobile station attaches to it.

After a connection is well established between the target base station and the mobile station, the target base station will send a notification to the zone gateway. At that point, the zone gateway begins forwarding the same service flow directly to the target base station, and stops sending packets to original serving base station.

When the FBSS handoff tunnel is empty, both the serving base station and the target base station restore their normal operations. In some embodiments, this involves releasing un-needed system resources until the next handoff happens.

With the example of FIG. 3, the functionality of serving base station 52 is only shown for the base station in its capacity as a serving base station; similarly the functionality of target base station 54 is only shown in respect of its capacity as a target base station. More generally, typically a given base station would be able to simultaneously function as both a target base station for one or more mobile stations and a serving base station for one or more different mobile stations in which case the combined functionality of both base stations 52,54 would be implemented in each base station.

Another embodiment of the invention provides a single base station adapted to implement fast base station switching. Specific examples are the base stations 52,54 of FIG. 3. In another specific example, a base station adapted to implement fast base station switching has at least one input port for receiving packets destined for mobile stations; an output port for outputting packets on a tunnel towards another base station; physical layer hardware; and a packet dispatcher adapted to transmit received packets for a given mobile station to the given mobile station via the physical layer hardware while the given mobile station is attached to the base station, and to send the packets towards the output port during a fast base station switch handoff to the another base station.

Figure 4:
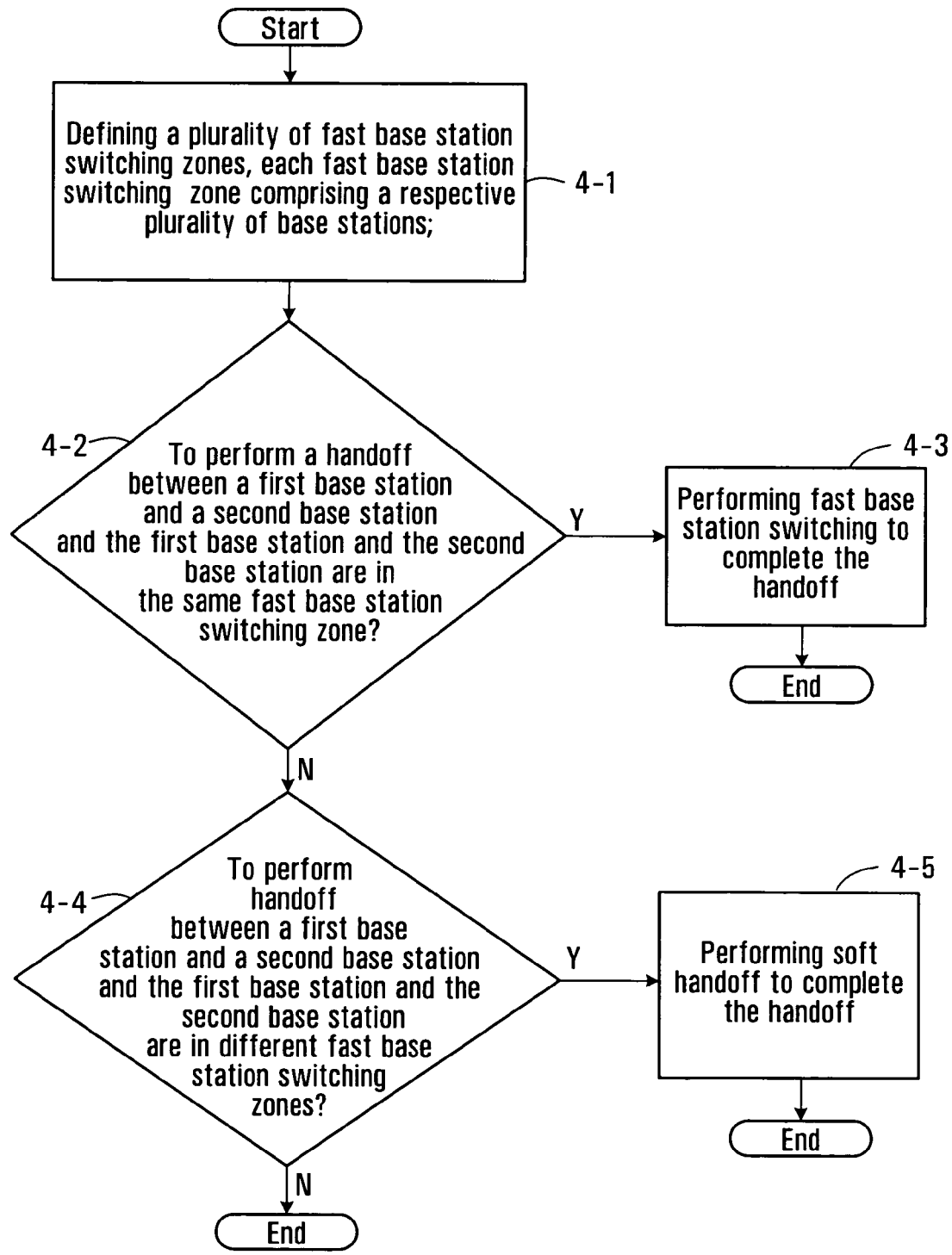
FIG. 4 is a flowchart of a method of performing hierarchical zone-based handoff.

In another embodiment of the invention, a hierarchical zone-based handoff approach is employed that combines inter-zone soft handoff and intra-zone FBSS. Referring to the flowchart of FIG. 4, the method begins at step 4-1 with defining a plurality of fast base station switching zones, each fast base station switching zone comprising a respective plurality of FBSS-enabled base stations. An FBSS-enabled base station is one that can participate in the fast base station switching handoff described above with reference to any one of FIGS. 1 to 3. If it is determined that it is necessary to perform a handoff between a first base station and a second base station, (yes path, step 4-2) then fast base station switching is performed to complete the handoff at step 4-3. If it is determined that it is necessary to perform handoff between a first base station and a second base station, and the first base station and the second base station are in different fast base station switching zones, (yes path, step 4-4), then soft handoff is performed to complete the handoff.

Figure 5:
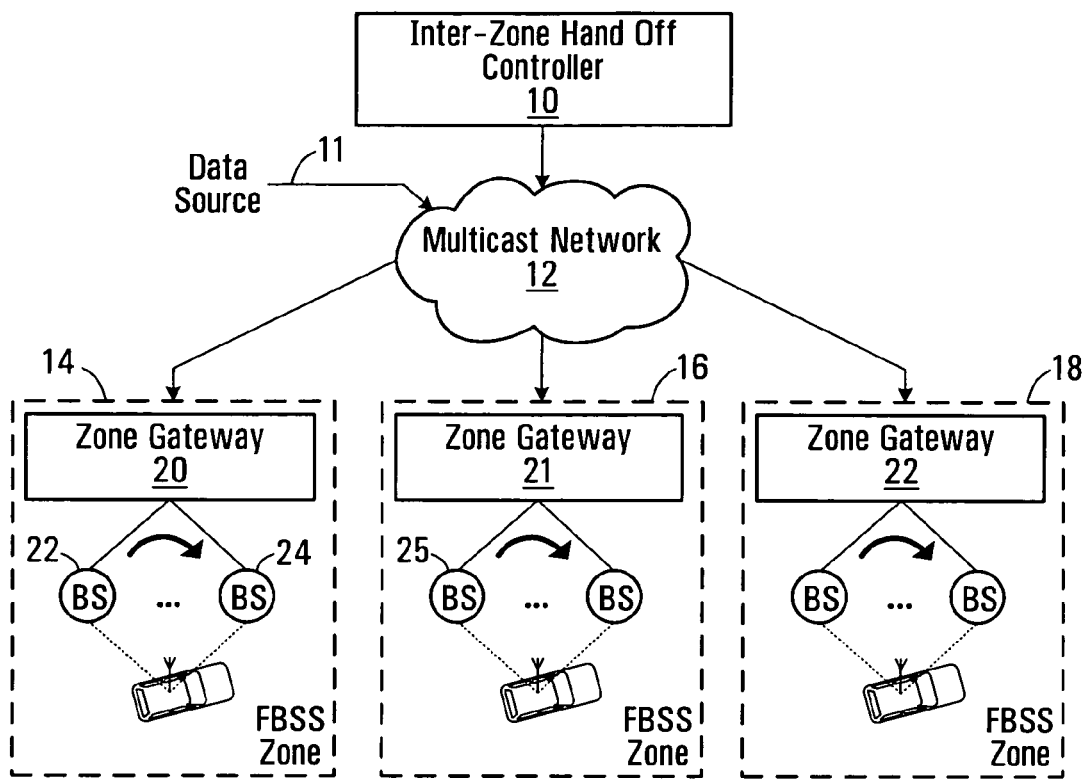
FIG. 5 is a block diagram of a system that performs hierarchical zone-based handoff.

FIG. 5 is a block diagram of a specific network adapted to implement the method described above. Shown is a inter-zone handoff controller 10 connected to a multicast network 12 that is in turn connected to a plurality of zone gateways 20,21,22. Each zone gateway 20,21,22 serves a respective coverage area referred to as an FBSS zone 14,16,18. Each of these zones includes a respective plurality of FBSS-enabled base stations. For example, FBSS zone 14 is shown to include base stations 22,24. Also shown is a data source 11. The inter-zone handoff controller 10 implements control over handoffs between zones. Actual traffic does not pass through the inter-zone handoff controller 10 in the illustrated example, but in other implementations, the inter-zone handoff controller 10 may also function as an inter-zone gateway in which case it also processes traffic.

More generally, any number of zone gateways might be implemented, and for each zone gateway, any number of base stations might be implemented. Multicast network 12 is simply any network that will enable the inter-zone gateway 10 to transmit packets to multiple of the zone gateways during an inter-zone handoff.

In operation, when a handoff between two base stations served by a given zone gateway, for example base stations 22,24 served by zone gateway 20, is to be executed, a fast base station switch handoff is executed within that zone.

On the other hand, if a handoff is to take place between two base stations and two FBSS zones, for example between base station 24 of FBSS zone 14, and base station 25 of FBSS zone 16, then a soft handoff is employed. This involves the inter-zone gateway 10 forwarding data packets through the multicast network 12 to both zone gateway 20 and zone gateway 21 for forwarding on to respective base stations 24,25. In this case, both base stations 24,25 transmit the packets over the air interface, and the mobile station can receive both of these and either select between them or perform diversity combining. More generally, methods of performing soft handoff are well understood, and for the case where soft handoff is to be performed between the base stations of two different FBSS zones, any appropriate soft handoff mechanism can be executed.

Detailed examples of how fast base station switching might be implemented have been described above with reference to FIGS. 1 to 3. For the purpose of the embodiment of FIG. 5, a hierarchical approach has been described that employs soft handoff on a higher hierarchical level, and employs FBSS on a lower level, within zones. More generally, in another embodiment of the invention, a hierarchical approach is employed in which a diversity handoff approach is used on a higher hierarchical level to handle handoffs between zones while a non-diversity handoff approach is used within individual zones referred to as non-diversity handoff zones. With a diversity handoff approach, multiple copies of a signal are available to a receiver and the receiver can either select between them or combine them. Soft handoff is a specific example of diversity handoff. With a non-diversity handoff approach, there is only one copy of a signal available to a receiver. Fast base station selection and fast base station switching are two specific examples of non-diversity-based handoff.

Figure 6:
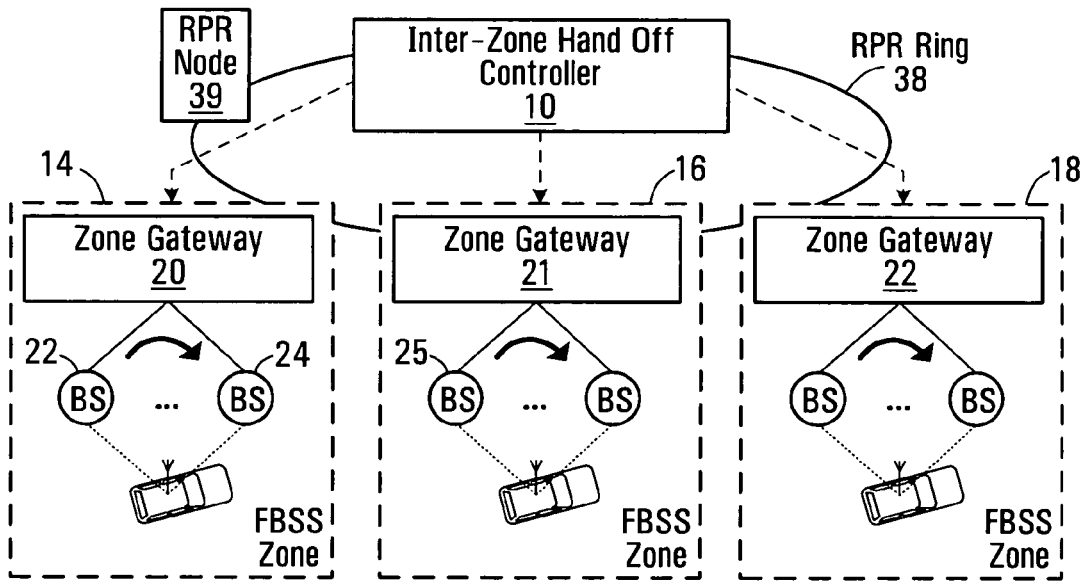
FIG. 6 is another block diagram of a system that performs hierarchical zone-based handoff.

A specific example of the network of FIG. 5 is shown in FIG. 6. In this case, the multicast network 12 consists of a resilient packet ring 38 serving as a global backbone that interconnects the inter-zone handoff controller 10 and the zone gateways 20,21,22. This allows for a zone-based handoff procedure built upon a hierarchical ring-tree network topology. The top level of this architecture is an handoff-enabled RPR-like topology, and it is controlled by a master handoff control function to conduct inter-zone data traffic anchor pointing. The master handoff control function can be implemented as part of the inter-zone handoff controller or it might be a specific functional element. Each RPR node in this ring is a zone gateway that represents a handoff zone, which is defined in terms of capacity, coverage, roaming topology and security domain. Also shown is an additional RPR node 39 functioning as a data source or through which is connected a data source. As was the case for the more general embodiment of FIG. 5, the inter-zone handoff controller 10 in some embodiments can function as an inter-zone gateway for traffic.

In this ring-tree handoff architecture, at the top level, the inter-zone handoff controller uses a SOHO approach to multicast the data flows to all potential targeting zone-based handoff sub-controllers. The multicasting can be implemented by utilizing RPR multicast capability. The choice of the targeting handoff zone(s) is made by network handoff intelligence. To reduce the cost in terms of traffic resource utilization, the number of chosen target zones may be limited. Combined with wise handoff intelligence, SOHO starts sending the data flow to the targeting zone before the mobile attaches to that target zone.

At each sub-tree level, an FBSS approach is used to conduct intra-zone handoff procedure. For example, FBSS fast IP tunnel switching technology can be applied in each zone to rapidly handoff from the serving base station to the potential target base station.

In some embodiments, the handoff functions at the inter-zone handoff controller and/or the zone gateways have built-in algorithms to determine a mobile station's mobility. They may communicate with each other to decide when to start and when to stop SOHO operation. This might for example be based on a global paging control function, latest location update information of mobile, current zone ID, mobile direction and mobile speed. The analysis can be structured to minimize the number of target zones, or at least to impose a maximum on the number of target zones. Other algorithm parameters might include radio cell coverage, radio channel allocation, traffic pattern, bandwidth, QoS and network traffic performance.

The described example uses IP tunnelling technologies to support FBSS in a wireless data access network. However, more generally, the approach is applicable to all L3/L2 packet networks including IP-in-IP, Mac-in-Mac, MPLS label stack, RPR and R-bridge networks.

Control Architecture

An overall network-wise handoff control architecture can be implemented in three levels: a master handoff controller at the ring level, zone-handoff-controller at ring node level and handoff-agent at each base station level.

The master handoff controller communicates with the zone-handoff-controllers, which in turn, communicate with the base station handoff agents, to collect mobile location information with paging functions, and to co-ordinate global handoff functions. The communication may be done via location enquiries periodically from master handoff controller, or via notifications reported by zone-handoff-controller and handoff agents.

The master handoff controller uses network intelligence to predict and to determine the potential handoff zones which the mobile is moving to, and to utilize RPR multicasting capability to deliver the data flows to these target zones. The intelligent handoff algorithms make decisions based on the global paging control function, the latest location update information of mobile, current zone ID, mobile direction and mobile speed. Each RPR node is an ASN Gateway anchor switch which conducts intra-zone handoff procedure. This anchor switch pre-cache the received data in the buffer (if it is a target zone), and distributes the data flows to either the serving base station or the target base station via handoff protocols/primitives. The intra-zone handoff procedure is FBSS approach described in the following sections.

In another embodiment, the wireless access network includes relay nodes, for example, to either expand the coverage area of base stations, or enhance data rate ubiquity. In some cases, the relays are in fixed locations such that the relationship between relays and base stations is fixed.

In other cases, relays can be provided in mobile locations, for example on trains. In such cases, the relationships between the relays and the base stations are not fixed.

Figure 7A:
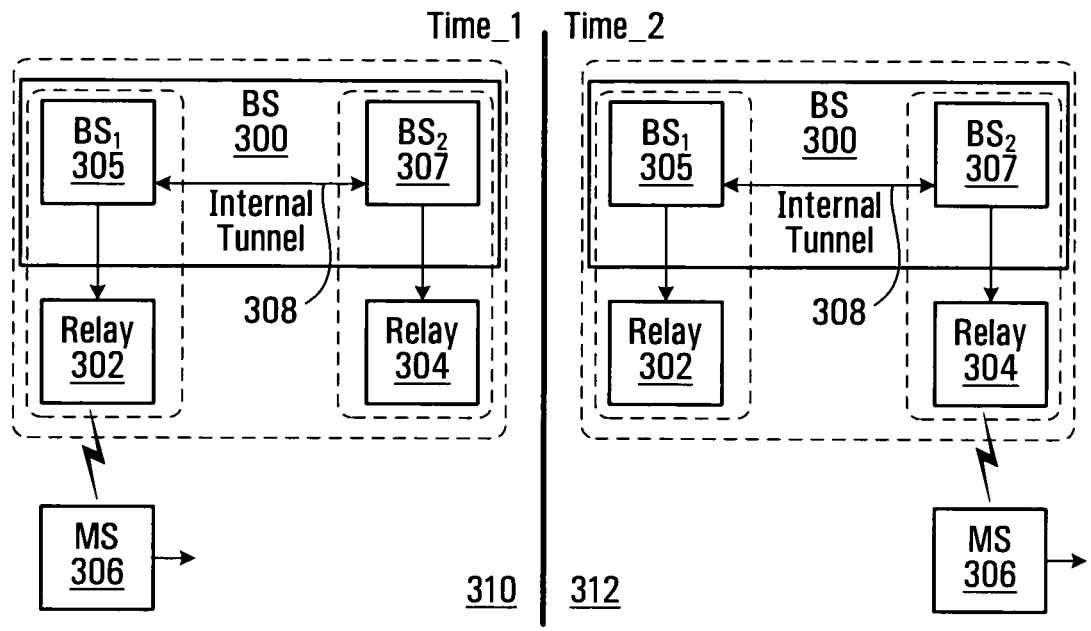
FIGS. 7A and 7B depict two examples of handoff in networks that employ relays in the path between base stations and mobile stations.

When the relays are fixed, in one embodiment, a third tier is added to the hierarchical handoff approach. In this case, one can organize a base station and associated relay station as a "virtual base station". If a mobile station moves from the coverage area of one relay of a given base station to another relay of the same base station, it can be treated the same as if the mobile station is moving from the coverage area of one virtual base station to another virtual base station within the same non-diversity handoff zone. The non-diversity handoff can then be performed. For example, this might be performed analogously to the fast base station switch between two virtual base station using a logical internal tunnel. This scenario is illustrated in FIG. 7A where a base station 300 is shown in fixed relationship with two relays 302,304. Logically, base station 300 can be organized as two virtual base stations 305,307 respectively associated with relays 302, 304. At time_1 (310, left side of drawing), a mobile station 306 is communicating with the relay 302, and at time_2 (312, right side of drawing), the mobile station is communicating with relay 304. In this case, the first virtual base station 305 forwards traffic to the second virtual base station 307 via internal tunnel 308 for some time, after which time the base station 300 will forward traffic directly to the second relay with appropriate newly assigned connectivity information. If the mobile station's mobility results in it moving to a different base station's coverage area within the same FBSS zone, then FBSS handoff is performed as before. Finally, if the mobile station's mobility results in it moving to a different base station's coverage area that is not within the same FBSS zone, then soft handoff is performed as before.

In another embodiment, the handoff between relays can be handled using another method, for example soft handoff.

Figure 7B:
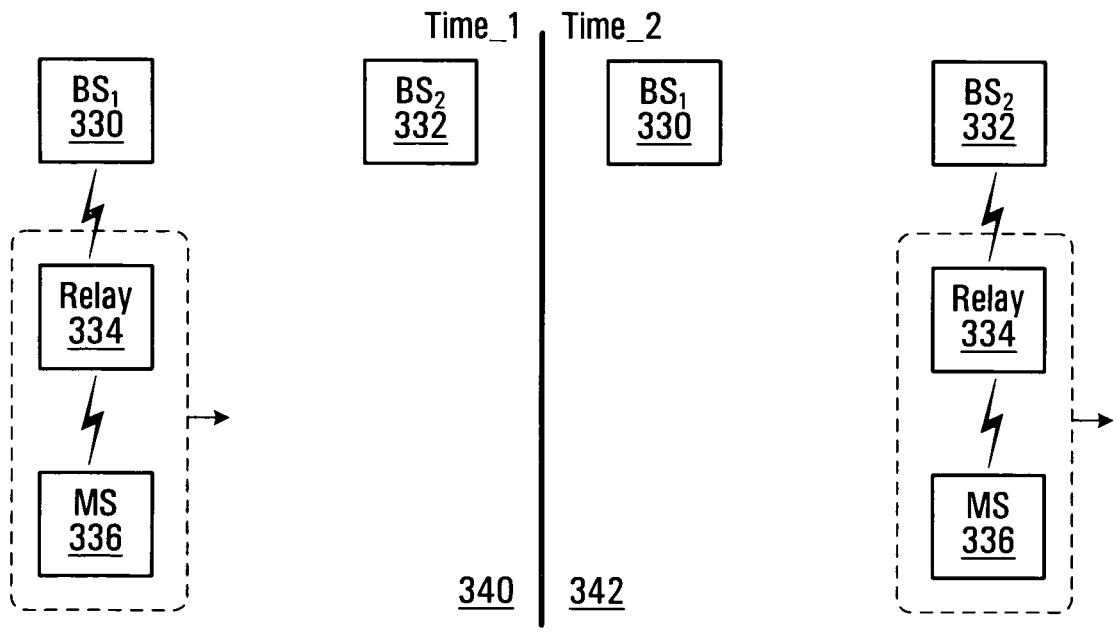

When the relays are mobile, typically the mobile station and the relay move together as a unit. An example of this scenario is depicted in FIG. 7B. Shown is a first base station 330 and a second base station 332. Also shown is a relay 334 that is serving a mobile station 336, with the relay 334 and mobile station 336 moving more or less together. At time_1 (340, left side of the figure) the relay 334 and mobile station 336 are being served by the first base station 330. At time_2 (342, right side of the figure) the relay 334 and the base station 336 are being served by the second base station 332. When the mobile station 336 plus relay 334 move from the coverage area of one base station to the coverage area of another base station, the handoff can be handled in the same way as if there was no relay. More specifically, if the new base station 332 is in the same FBSS zone as the previous base station 330, then a FBSS handoff is performed. If the new base station 332 is not in the same FBSS zone as the previous base station 330, then a soft handoff is performed.

Numerous modifications and variations of the present invention are possible in light of the above teachings. It is therefore to be understood that within the scope of the appended claims, the invention may be practiced otherwise than as specifically described herein.

We claim:

1. A method comprising:
defining a plurality of non-diversity handoff zones, each non-diversity handoff zone comprising a respective plurality of non-diversity-enabled base stations;
to perform a handoff between a first base station and a second base station of said base stations:
performing a non-diversity handoff to complete the handoff if the first base station and the second base station are in the same non-diversity handoff zone;
performing a diversity handoff to complete the handoff if the first base station and the second base station are in different non-diversity handoff zones.

2. The method of claim 1 wherein performing a non-diversity handoff comprises performing fast base station selection.

3. The method of claim 1 wherein performing a non-diversity handoff comprises performing fast base station switching.

4. The method of claim 3 wherein performing fast base station switching comprises:
a first base station acting as a serving base station receiving packets from a data source destined for the mobile station;
the first base station transmitting packets to the mobile station;
to implement the fast base station switch to the second base station, the first base station forwarding to the second base station all packets that have not been transmitted to the mobile station or that have not been acknowledged by the mobile station;
the second base station receiving the packets from the first base station;
the second base station transmitting packets received from the first base station to the mobile station;
later, the second base station receiving packets from the data source destined for the mobile station such that the second base station acts as a serving base station.

5. The method of claim 4 further comprising:
establishing a tunnel between the first base station and the second base station for forwarding packets between the first base station and the second base station.

6. The method of claim 3 further comprising:
at the first base station:
a) during non-handoff operation, receiving the packets on an ingress port and queuing them in an ingress queue;
b) during non-handoff operation, de-queuing packets from the ingress queue and transmitting them over an air interface;
c) during handoff, de-queuing packets from the queue and re-queuing them in an egress queue;
d) during handoff, de-queuing packets from the egress queue and sending them to the second base station on an egress handoff port;
at the second base station:
e) during handoff, receiving the packets on an ingress handoff port and queuing them in an ingress queue;
f) during handoff, de-queuing packets from the ingress queue and transmitting them over an air interface.

7. The method of claim 1 further comprising:
defining a plurality of virtual base stations each comprising a relay and a base station served by the relay;
wherein for the purpose of non-diversity handoff zones, each virtual base station is treated as a non-diversity-enabled base station.

8. The method of claim 1 further comprising:
providing service to at least one mobile station with a mobile relay, the mobile relay and served mobile station comprising a mobile relay and mobile station pair;
to perform a handoff of a mobile relay and mobile station pair between a first base station and a second base station of said base stations:
performing a non-diversity handoff to complete the handoff if the first base station and the second base station are in the same non-diversity handoff zone;
performing a diversity handoff to complete the handoff if the first base station and the second base station are in different non-diversity handoff zones.

9. A system comprising:
a plurality of base stations organized into non-diversity handoff zones;
an inter-zone handoff controller;
the system being adapted to perform handoffs between a first of the base stations and a second of the base stations by:
performing a non-diversity handoff to complete the handoff if the first base station and the second base station are in the same non-diversity handoff zone;
performing a diversity handoff under control of the inter-zone handoff controller to complete the handoff if the first base station and the second base station are in different non-diversity handoff zones.

10. The system of claim 9 adapted to perform a non-diversity handoff by performing fast base station selection.

11. The system of claim 9 adapted to perform a non-diversity handoff by performing fast base station switching.

12. The system of claim 11 adapted to perform fast base station switching by:
- a first base station acting as a serving base station receiving packets from a data source destined for the mobile station;
- the first base station transmitting packets to the mobile station;
- to implement the fast base station switch to the second base station, the first base station forwarding to the second base station all packets that have not been transmitted to the mobile station or that have not been acknowledged by the mobile station;
- the second base station receiving the packets from the first base station;
- the second base station transmitting packets received from the first base station to the mobile station;
- later, the second base station receiving packets from the data source destined for the mobile station such that the second base station acts as a serving base station.

13. The system of claim 9 further comprising a network hierarchical handoff control architecture comprising said inter-zone handoff controller at inter-zone level, zone-handoff-controllers at intra-zone level and handoff-agents at each base station.

14. The system of claim 9 adapted to establish a tunnel between the first base station and the second base station for forwarding packets between the first base station and the second base station.

15. The system of claim 9 wherein:
the first base station is adapted to:
a) during non-handoff operation, receiving the packets on an ingress port and queuing them in an ingress queue;
b) during non-handoff operation, de-queuing packets from the ingress queue and transmitting them over an air interface;
c) during handoff, de-queuing packets from the ingress queue and re-queuing them in an egress queue;
d) during handoff, de-queuing packets from the egress queue and sending them to the second base station on an egress handoff port;
the second base station is adapted to:
e) during handoff, receiving the packets on an ingress handoff port and queuing them in an ingress queue;
f) during handoff, de-queuing packets from the ingress queue and transmitting them over an air interface.

16. A base station comprising:
at least one input port for receiving packets destined for mobile stations;
an output port for outputting packets on a tunnel towards another base station in a common non-diversity handoff zone;
physical layer hardware;
a packet dispatcher adapted to transmit received packets for a given mobile station to the given mobile station via the physical layer hardware while the given mobile station is attached to the base station, such that the packet dispatcher continues to transmit received packets for a given mobile station to the given mobile station during diversity handoff to another base station in a different non-diversity handoff zone, and to send the packets towards the output port during a fast base station switch handoff to the another base station in the common non-diversity handoff zone.

\* \* \* \* \*